United States Patent [19]

Koike

[11] 4,047,751

[45] Sept. 13, 1977

[54] ROOF RAIL WEATHERSTRIP FOR MOTOR VEHICLE

[75] Inventor: Shyouichi Koike, Seki, Japan

[73] Assignee: Nissan Motor Company, Limited, Yokohama, Japan

[21] Appl. No.: 604,446

[22] Filed: Aug. 13, 1975

[30] Foreign Application Priority Data

| Aug. 14, 1974 | Japan | 49-97110[U] |
| Dec. 12, 1974 | Japan | 49-150873[U] |
| Mar. 7, 1975 | Japan | 50-30951[U] |

[51] Int. Cl.² ............................................. B60J 1/17
[52] U.S. Cl. .................................. 296/146; 49/498; 296/93
[58] Field of Search ............... 296/146, 28 R, 93; 49/498, 493

[56] References Cited

U.S. PATENT DOCUMENTS

| 2,994,930 | 8/1961 | Cromwell | 49/498 |
| 3,294,436 | 12/1966 | Bull | 296/28 |
| 3,600,858 | 8/1971 | Savell | 49/498 |
| 3,775,907 | 12/1973 | Weaver | 49/498 |
| 3,939,608 | 2/1976 | Asakai | 49/493 |

*Primary Examiner*—Philip Goodman
*Assistant Examiner*—John A. Carroll

[57] ABSTRACT

A weatherstrip constructed in accordance with the present invention is to be used in a motor vehicle body structure including a roof rail defining an upper side of a window opening and a vehicle door having a window pane movable between raised and lowered position relative to the window opening. The weatherstrip comprises an elongated hollow resiliently deformable member secured to the roof rail. The resiliently deformable member has a web portion and a bridge portion. The bridge portion is so constructed and arranged in a hollow of the resiliently deformable member that upon flexure of the web portion by the window pane in raised position, the bridge portion is compressed between the roof rail and the window pane to bias the web portion against the window pane, and upon movement of the window pane in raised position in a direction substantially normal to the plane of the window opening, the bridge portion is flexed to keep the web portion in contact with the window pane.

7 Claims, 9 Drawing Figures

ROOF RAIL WEATHERSTRIP FOR MOTOR VEHICLE

The present invention relates to a roof rail weatherstrip for a motor vehicle body structure including a roof rail defining an upper side of a window opening and a vehicle door having a window pane movable between raised and lowered position relative to the window opening.

It is well known that in order to minimize the undesirable and annoying phenomenon known as "wind noise" which may occur at high vehicle operating speeds, a seal must be maintained about the periphery of a vehicle window pane. This is because of a great deal of "wind noise" heard during high speed vehicle operation actually is caused by relatively high pressure air from the vehicle passenger compartment passing around the edge of the window pane and into the relatively low-pressure area proximate the outer skin of the moving vehicle.

Maintaining a seal around a vehicle window pane has been rendered more difficult in modern vehicles, especially vehicles which have no frame support for the door window pane. Even though conventional weatherstrips are used to establish a seal about the window periphery, such a seal will be broken upon reduction of pressure in area proximate the outer skin of the motor vehicle as compared to pressure in the passenger compartment. Reduction of pressure normally occurs during high speed vehicle operation. The unsupported window pane then moves outwardly. This outward movement causes the destruction of the seal about the top edge of the window pane.

It is an object of the present invention to provide a weatherstrip for a motor vehicle body structure capable of making and maintaining an air tight seal about the top edge of an unsupported window pane of a vehicle door during all vehicle operation conditions. In order to accomplish this end, the weatherstrip of the invention is in contact and maintains seal with the window pane during outward movement thereof.

A weatherstrip constructed in accordance with the present invention is to be used in a motor vehicle body structure including a roof rail defining an upper side of a window opening and a vehicle door having a window pane movable between raised and lowered position relative to the window opening. The weatherstrip comprises an elongated hollow resiliently deformable member secured to the roof rail and having a web portion and a bridge portion. The bridge portion is so constructed and arranged in a hollow of the resiliently deformable member that upon flexure of the web portion by the window pane in raised position, the bridge portion is compressed between the roof rail and the window pane to bias the web portion against the window pane, and upon movement of the window pane in raised position in a direction substantially normal to the plane of the window opening, the bridge portion is flexed to keep the web portion in contact with the window pane.

A specific feature of the weatherstrip of the invention is that upon flexure of the web portion by the window pane in raised position, the bridge portion is flexed toward the inboard side of the weatherstrip to cause a downwardly bowed outboard portion of the web portion to be flexed into contact with the window pane as a function of flexure of the bridge portion toward the weatherstrip thus providing a shield over the top edge of the window pane to increase the sealing area and biasing the window pane toward the inboard side of the weatherstrip. Preferably the web portion has an inboard lip portion for seal contact with the window pane.

A still more specific feature of the weatherstrip of the invention is that an upper end of the bridge portion is disposed outwardly of the plane of the window opening when the weatherstrip is in released condition. The result is that the compression of the bridge portion increases as the window pane in raised position moves outwardly in a direction substantially normal to the plane of the window opening and the outward movement is thus resisted.

The present invention will be further described hereinafter with reference to the accompanying drawings, in which.

Figure 1:
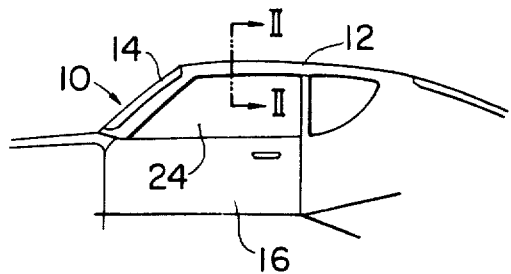
FIG. 1 is a partial side elevational view of a motor vehicle having a weatherstrip constructed in accordance with the invention thereon.
Figure 2:
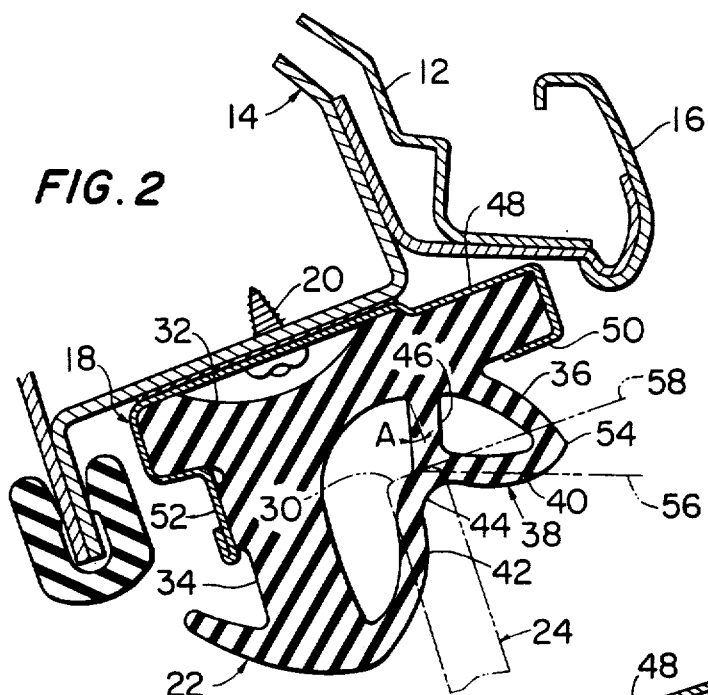
FIG. 2 is an enlarged partial sectional view taken along the line II—II of FIG. 1, the window pane being shown in its lowered position.

Referring now in detail to the drawings, and more particularly to FIG. 1, the numeral 10 denotes generally a motor vehicle including a weatherstrip constructed in accordance with the present invention. The vehicle includes a body structure such as a roof 12, a windshield 14 and a door 16. The door 16 is conventionally hinged to a body pillar section. As best shown in FIG. 2, the roof 12 has a side roof rail structure designated generally as 14, and a rain gutter 16 is provided to catch water which runs down the side of the roof 12. On the bottom or lower surface of the roof rail 14 is mounted a weatherstrip retainer clip designated generally as 18 by means of a plurality of screws, only one being shown at 20. The weatherstrip now designated generally as 22 is secured to the bottom surface of the roof rail 14 through this retainer clip 18. The roof rail 14 defines an upper side of a window opening located above the door 16.

A window pane 24 is movable vertically between this window opening and door 16 by means of a conventional window regulator (not shown) located within the door 16. The window pane 24 has an outboard surface 26, an inboard surface 28 and a upper or top edge 30. The window pane 24, when in the raised position illustrated in FIG. 3 in solid lines, is not framed nor does this window pane move in channels. The window pane 24 thus is unsupported against possible lateral movement when in the raised position illustrated in FIG. 3 (see also FIG. 4).

The weatherstrip 22 includes an elongated hollow resiliently deformable member secured to the roof rail 14. The resiliently deformable member has an upper mounting portion 32, and inner side portion 34 extending substantially downwardly from the upper mounting portion 32, a lobe-like arm portion 36 projecting outwardly at an angle from the upper mounting portion 32, and a web portion 38 extending between the inner side portion 34 and arm portion 36. The upper mounting portion 32, inner side portion 34, arm portion 36 and web portion 38 define a hollow of the resiliently deformable member. The web portion 38 has a downwardly bowed outboard lip portion 40 and an inboard lip portion 42. The outboard and inboard lip portions define between them a groove 44. Within the hollow of the resiliently deformable member a bridge portion 46 extends between the upper mounting portion 32 and web portion 38.

The retainer clip 18 is formed from a rigid material and has a channel section 48 which the upper mounting portion 32 having a rectangular profile is fixedly clamped in a conventional manner. The channel section 48 has a leg portion 50 projecting into a groove formed between the upper mounting portion 32 and arm portion 36. The retainer clip 18 has an integral downward extension to which the inner side portion 34 is secured. The transverse thickness of the inner side portion 34 is greater than the transverse thickness of the arm portion 36 or web portion 38 to concentrate the flexure action in the arm and web portions.

The bridge portion 46 has a lower end connected to the back of the groove 44 and has an upper end connected to the upper mounting portion 32. The bridge portion 46, when the weatherstrip 22 is in the released or nondeformed condition illustrated in FIG. 2, forms an acute angle A with the plane of the window opening and the upper end of the bridge portion 46 is disposed outwardly of the plane of the window opening.

When the weatherstrip 22 is in the released condition illustrated in FIG. 2, an outward end 54 of the outboard lip portion 40 is positioned above a first plane 56 in which the top edge 30 of the window pane 24 in the raised position would lie as the vehicle door 16 (see FIG. 1) swings about its hinges into a closed position and the outboard lip portion 40 partially projects below the plane 56. The outboard end 54 is positioned below a second plane 58 in which the top edge 30 of the window pane 24 in the raised position would lie as the window pane 24 moves outwardly in a direction substantially normal to the plane of the window opening (see FIG. 4 also).

Figure 3:
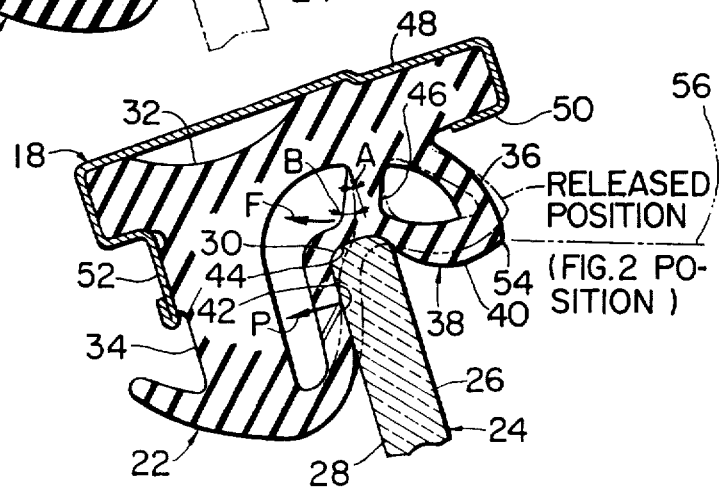
FIG. 3 is a view similar to FIG. 2, but with the window pane in its raised position.

As may be seen in FIG. 3, when the window pane 24 is in the raised position, the top edge 30 of the window pane 24 engages the groove 30 and flexes the web portion 38 upwardly. Upon this flexure of the web portion 38, the bridge portion 46 is compressed between the upper mounting portion 32 and the top edge 30 of the window pane 24 in the raised position to bias the web portion 38 against the top edge 30 of the window pane 24 to establish a seal. As the bridge portion 46 is angled with respect to the plane of the window opening as shown in FIG. 2, the bridge portion 46 is flexed toward the inboard side of the weatherstrip about its upper end connected to the upper mounting portion 32 as the center of the flexure when the top edge 30 of the window pane 24 flexes the web portion 38 upwardly as shown in FIG. 3. The bridge portion 46 then increases its angle with the plane of the window opening by an angle B and biases the downwardly bowed outboard lip portion 40 toward the inboard side of the weatherstrip with a force indicated at an arrow F with the result that the outboard lip portion is flexed into contact with the window pane 24 to provide a shield over the top edge 30 to increase the sealing area of the weatherstrip and to bias the window pane 24 wih a force indicated by an arrow P into contact with the inboard lip portion 42. It will now be appreciated that when the window pane 24 is in the raised position illustrated in FIG. 3, the sealing area of the weatherstrip 22 is increased due to the compression and inward flexure or tilt of the bridge portion 46.

Figure 4:
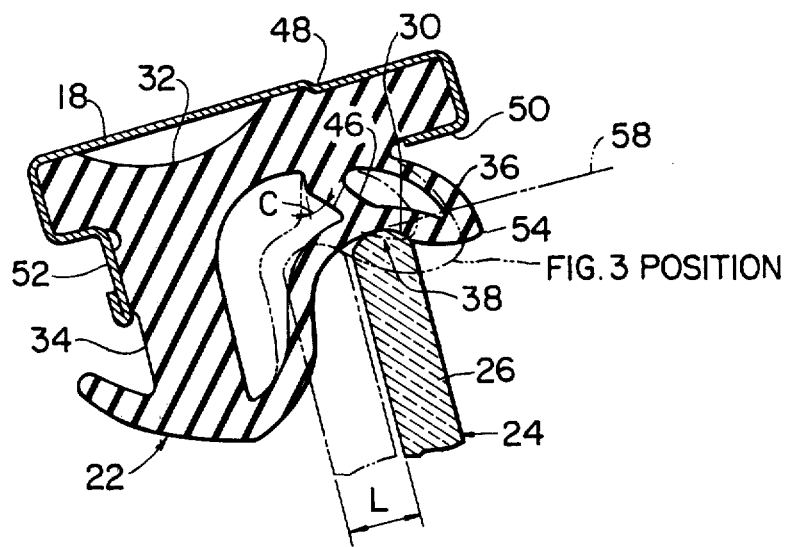
FIG. 4 is a view similar to FIG. 2, but with the window pane in its raised position moving outwardly in a direction substantially normal to the plane of the window opening.

In the event that pressure in the area proximate the outboard surface 26 of the window pane 24 reduces during the operation of the motor vehicle 10 at high speed, outward movement of the window pane 24 in a direction normal to the plane of the window opening will occur due to pressure difference between a relatively high pressure in the passenger compartment and a relatively low pressure in the area proximate the outer skin of the motor vehicle. FIG. 4 illustrates in the solid lines a position of the weatherstrip 22 when the window pane 24 moves outwardly from the position shown in dotted lines and corresponding to the position illustrated in FIG. 3, in a direction substantially normal to the plane of the window opening by a length L. During this outward movement of the window pane 24 from the position shown in dotted lines in FIG. 4 to the position shown in solid lines in FIG. 4, the bridge portion 46 flexes toward the outboard side of the weatherstrip. When the window pane 24 is in the position illustrated in FIG. 4, the bridge portion 46 then forms an angle C with the plane of the window opening toward the outboard side of the weatherstrip. The bridge portion 46 is held compressed between the upper mounting portion 32 and top edge 30 of the window pane 24 because the distance between the upper mounting portion 32 and top edge 30 is substantially constant during the outward movement of the window pane, thus keeping the web portion 38 in contact with the top edge 30 of the window pane 24. It will be noted that the lower end of the bridge portion 46 connected to the web portion 38 moves as the top edge 30 of the window pane 24 moves outwardly, whereas the upper end of the bridge portion 46 connected to the upper mounting portion 32 is fixed. Because the bridge portion 46 is compressed to bias the web portion 38 into frictional contact with the top edge 30, the outward movement of the window pane 24 is resisted and thus further outward movement is prevented.

Figure 5:
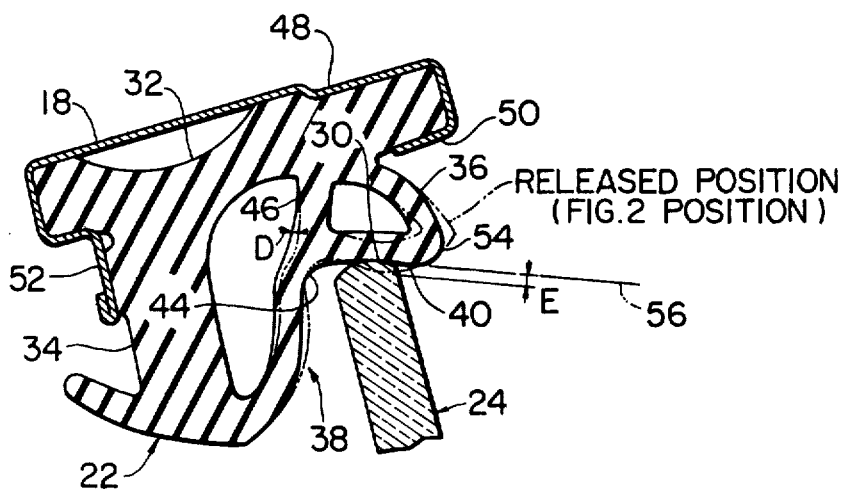
FIG. 5 is a view similar to FIG. 2, but with the window pane in its raised position being about to move into a seal area on a web portion of the weatherstrip as the vehicle door swings into a closed position.

As the vehicle door 16 is opened with the window pane 24 in a raised position, the top edge 30 moves out of the groove 44 along the plane 56 (see FIG. 3). As, in the position illustrated in FIG. 3, the window pane 24 is biased in a direction toward the inboard side of the weatherstrip 22 and, in the position illustrated in FIG. 5, the outward movement of the top edge 30 of the window pane 24 along the plane 56 is resisted by the outboard lip portion which is biased toward the inboard side of the weatherstrip 22, the door opening resistance is slightly increased with the window pane 24 in a raised position. This however is effective in reducing the possibility of accidental opening of the vehicle door 16 which might occur if the vehicle door 16 is closed but in unlocked condition. As the vehicle door 16 is closed with the window pane 24 in a raised position along the plane 56, the top edge 30 of the window pane 24 engages the outboard lip portion 40 thus flexing the outboard lip portion 40 by an amount designated by E and biasing the bridge portion 46 in a direction toward the inboard side of the weatherstrip by an angle D as shown in FIG. 5 and moves subsequently into the groove 44 to take the position illustrated in FIG. 3. Because the bridge portion 46 flexes relatively easily toward the inboard side of the weatherstrip with respect to the plane of the window opening, the vehicle door 16 can be opened with a relatively little resistance. It will now be understood that although the weatherstrip 22 of the invention provides some resistance to opening of the door 16 with the window pane 24 in the raised position, there is a little resistance to closing of the door 16 with the window pane 24 in the raised position.

It will now be appreciated that due to the compression of the bridge portion 46, a seal during outward movement of the window pane 24 in raised position in a direction substantially normal to the plane of the window opening is maintained.

Referring again to FIG. 4, it will be noted that the outboard end 54 of the outboard lip portion 40 is to be positioned below the plane 58 to prevent the window pane 24 from slipping outwardly from the weatherstrip 22. To hold the outboard end 54 below the plane 58 so that the window pane 24 may be prevented from slipping out of the weatherstrip 22, the arm portion 36 should preferably have a block portion 60, as shown in FIGS. 6 and 7.

Figure 6:
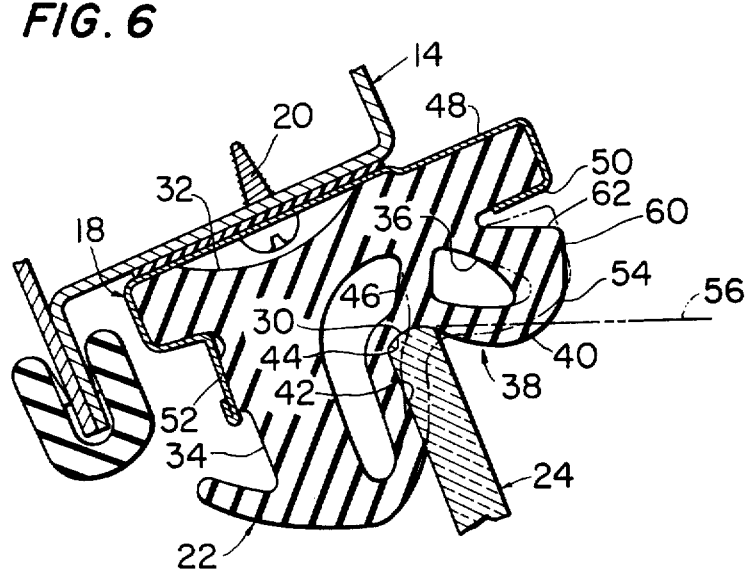
FIG. 6 is a view similar to FIG. 2, illustrating a modified form of a weatherstrip of the invention, parts being shown in one position in solid lines and in another position in broken lines.
Figure 7:
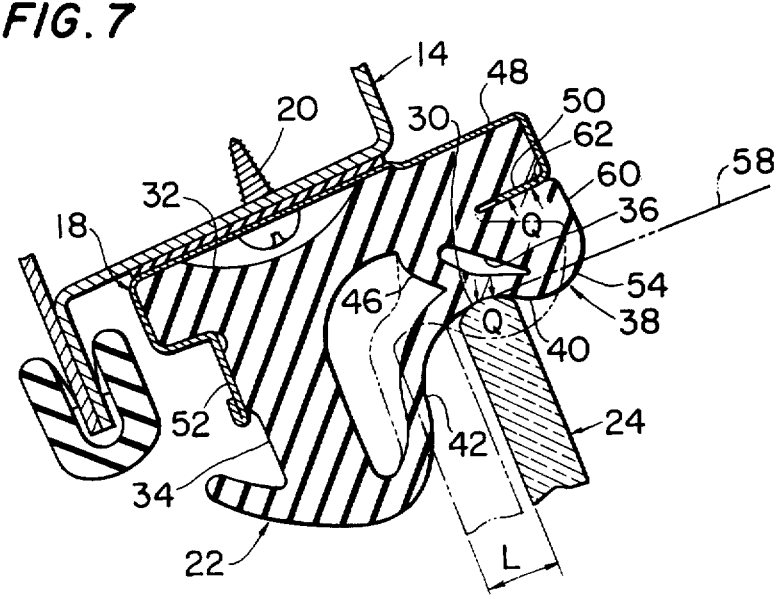
FIG. 7 is a view similar to FIG. 6, parts being shown in one position in broken lines which have been shown in solid lines in FIG. 6 and in another position in solid lines.

Referring to FIGS. 6 and 7 the same reference numerals as those used in FIGS. 2 through 5 are used to designate the corresponding counter parts. FIG. 6 illustrates in broken lines the corresponding position of a weatherstrip 22 to the position illustrated in FIG. 2, and in solid lines the corresponding position of the weatherstrip 22 to the position illustrated in solid lines in FIG. 3. FIG. 7 illustrates in dotted lines the corresponding position of the weatherstrip 22 to the position illustrated in solid lines in FIG. 6, and in solid lines the corresponding position of the weatherstrip 22 to the position illustrated in solid lines in FIG. 4.

The block portion 60 has an upper flat surface 62 adapted to abut leg portion 50 of a channel section 48 of a retainer clip 18. The flat surface 62 is normally spaced from the leg portion 50, but when the window pane 24 moves outwardly to the position illustrated in solid lines in FIG. 7, the flat surface 62 comes into contact with the leg portion 50 to render the outboard end 54 of a downwardly bowed outboard lip portion 40 positioned below the plane 58 so that the window pane 24 is held against further outward movement beyond the position illustrated in solid lines in FIG. 7. When the window pane 24 tends to move outwardly beyond the position illustrated in solid lines in FIG. 7, such an outward movement biases the block portion 60 against the leg portion 50 with a force Q thus causing the outboard lip portion 40 to be biased against the top edge 30 with a reaction force Q.

Figure 8:
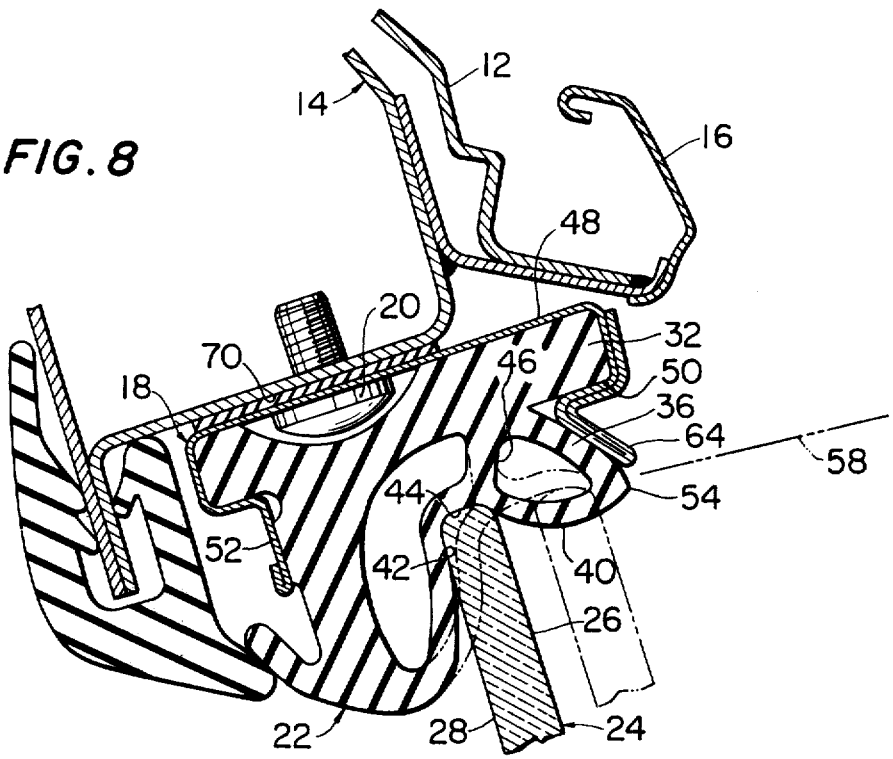
FIG. 8 is a view similar to FIG. 2, illustrating the weatherstrip of FIGS. 2-5 with a different retainer clip.

Referring to FIG. 8 the same reference numerals as those used in FIGS. 2 through 5 are used to designate the corresponding counter parts. FIG. 8 illustrates in solid lines the corresponding position of a weatherstrip 22 to the position illustrated in solid lines in FIG. 3, and in dotted lines the corresponding position of the weatherstrip 22 to the position illustrated in solid lines in FIG. 4.

As shown in FIG. 8, a retainer clip 18 has an arm section 64 projecting outwardly at an angle from the leg portion 50 of the channel section 48. The arm section 64 is positioned in a groove formed between the upper mounting portion 32 and arm portion 36 of the resiliently deformable member 22. The arm section 64 of the retainer clip 18 engages the arm portion 36 to keep the groove between the upper mounting portion 32 and the arm portion 36 open so that the outboard end 54 of the outboard lip portion 40 may be positioned below the plane 58.

Figure 9:
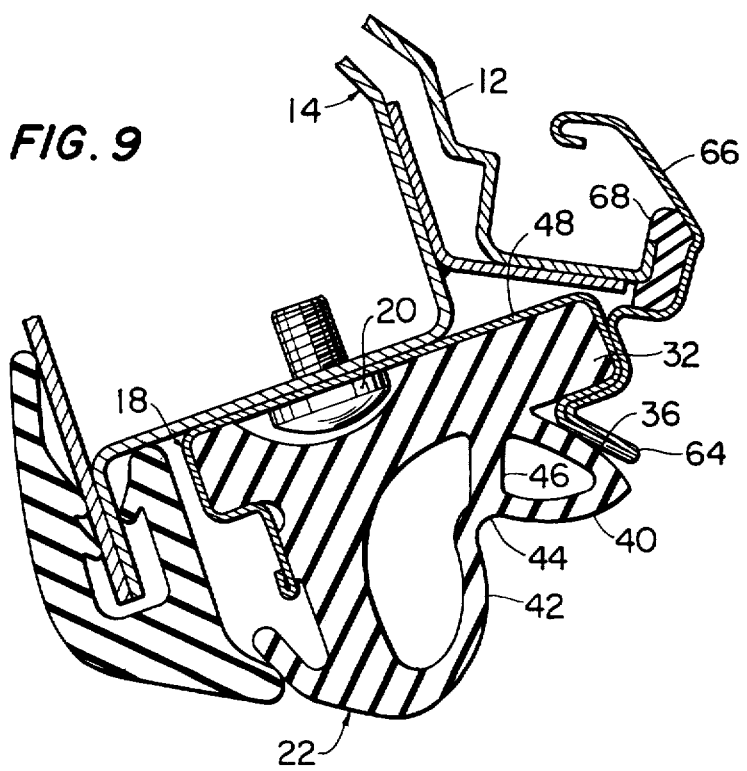
FIG. 9 is a view similar to FIG. 8, illustrating a modified retainer clip which forms a rain gutter.

Referring to FIG. 9 the same reference numerals as those used in FIG. 8 are used to designate the corresponding counter parts. A retainer clip shown in this Figure has an upward extension 66 projecting from the arm section 64. Roof 12 cooperates with the upward extension 66 to form a rain gutter and a seal member 68 is provided between the roof rail and the upward extension 66, with the result that a conventional seal member 70 (see FIG. 8) disposed between the roof rail 14 and the channel section 48 is eliminated.

What is claimed is:

1. A weatherstrip in a motor vehicle body structure including a roof rail defining an upper side of a window opening and a vehicle door having a window pane movable between raised and lowered position relative to the window opening, comprising:

an elongated hollow resiliently deformable member having
a. a mounting portion secured to the roof rail;
b. an inner side portion extending substantially downwardly from the mounting portion;
c. an arm portion projecting outwardly at an angle from the mounting portion;
d. a web portion extending between the inner side portion and the arm portion;
the mounting portion, inner side portion, arm portion and web portion defining the hollow of the elongated hollow resiliently deformable member;
e. a brace portion disposed in the hollow of the elongated hollow resiliently deformable member;
the transverse thickness of the inner side portion being greater than the transverse thickness of the arm portion or web portion to concentrate the flexure action in the arm portion and web portion;
the web portion having a downwardly bowed outboard lip portion and inboard lip portion;
the brace portion having an upper end connected to the mounting portion and a lower end connected to the web portion, the upper end of the brace portion being disposed outwardly of the plane of the window opening, the lower end of the brace portion being disposed inwardly of the upper end with respect to the plane of the window opening such that upon flexure of the web portion by the window pane in raised position, the brace portion swings toward the inner side portion with the upper end thereof as its hinge to flex the downwardly bowed outboard lip portion into contact with the window pane thereby to bias the window pane into contact with the inboard lip portion.

2. A weatherstrip in a motor vehicle body structure as claimed in claim 1, further in combination therewith of: a retainer clip formed from a rigid material mounted securely to the roof rail and having a channel section which the mounting portion of the resiliently deformable member is fixedly clamped in, the channel section having a leg portion projecting into a groove formed between the mounting portion of the resiliently deformable member and the arm portion thereof from the outboard side of the channel section, the arm portion of the resiliently deformable member being so constructed and arranged that when the window pane in raised position moves outwardly in a direction substantially normal to the plane of the window opening, the arm portion comes into contact with the leg portion to render the web portion in such configuration that the window pane is held against the further outward movement.

3. A weatherstrip in a motor vehicle body structure as claimed in claim 1, further in combination therewith of: a retainer clip formed from a rigid material mounted securely to the roof rail and having a channel section which the mounting portion of the elongated hollow resiliently deformable member is fixedly clamped in, the channel section having a leg portion projecting into a groove formed between the mounting portion and the arm portion thereof from the outboard side of the channel section, the retainer clip having an arm section projecting outwardly at an angle from the leg portion of the channel section and positioned in the groove, the arm section of the retainer clip engaging the arm portion of the resiliently deformable member to keep the groove between the mounting portion and the arm portion of the resiliently deformable member open.

4. In a motor vehicle structure as claimed in claim 1, further comprising:

a retainer clip securely mounted to the roof rail and having a base portion secured to the resilient deformable member, the retainer clip having an integral upward extension projecting from the outboard side of the base portion of the retainer clip; and a roof cooperating with the integral upward extension of the retainer clip to form a rain gutter.

5. In a motor vehicle structure as claimed in claim 3, in combination with the retainer clip of: a roof, said retainer clip having an integral upward extension from the outboard side of the channel section, the roof cooperating with the integral upward extension of the retainer clip to form a rain gutter.

6. In a motor vehicle structure as claimed in claim 1, in which upon disengagement of the top edge of the window pane with the resiliently deformable member, the outboard end of the downwardly bowed outboard lip portion is positioned above a first plane in which the top edge of the window pane in raised position would lie as the vehicle door swings about its hinge into a closed position and the downwardly bowed outboard lip portion partially project below the first plane.

7. In a motor vehicle structure as claimed in claim 6, in which the outboard end of the downwardly bowed outboard lip portion is positioned below a second plane in which the top edge of the window pane in raised position would lie as the window pane moves outwardly in a direction substantially normal to the plane of the window opening.

* * * * *